United States Patent [19]

Needham

[11] Patent Number: 5,532,282

[45] Date of Patent: Jul. 2, 1996

[54] POLYOLEFIN-BASED COMPOSITION FOR ROTATIONAL MOLDING

[75] Inventor: Donald G. Needham, Ramona, Okla.

[73] Assignee: Neeco, Inc., Ramona, Okla.

[21] Appl. No.: 357,826

[22] Filed: Dec. 16, 1994

[51] Int. Cl.⁶ ............................... C08J 9/08; C08K 5/09; C08L 23/04

[52] U.S. Cl. ............................ 521/93; 525/240; 521/134; 521/97; 524/528; 524/399; 524/322; 524/400; 264/310

[58] Field of Search .............................. 521/59, 134, 93; 524/528, 399, 400; 525/240

[56] References Cited

U.S. PATENT DOCUMENTS

| | | |
|---|---|---|
| 3,461,087 | 8/1969 | Pritchard . |
| 3,814,778 | 6/1974 | Hosoda et al. . |
| 3,876,613 | 4/1975 | Needham et al. . |
| 4,107,354 | 8/1978 | Wilkenloh et al. . |
| 4,110,269 | 8/1978 | Ehrenfreund . |
| 4,267,080 | 5/1981 | Yokoyama et al. . |
| 4,275,168 | 6/1981 | Watanabe et al. . |
| 4,533,696 | 8/1985 | Schrijver et al. . |
| 4,678,834 | 7/1987 | Boivin et al. . |
| 4,900,792 | 2/1990 | Chen et al. . |
| 5,034,171 | 6/1991 | Kiczek et al. . |
| 5,225,107 | 7/1993 | Kretzschmann et al. . |
| 5,369,136 | 11/1994 | Park et al. . |
| 5,380,766 | 1/1995 | Träger . |

FOREIGN PATENT DOCUMENTS 983226  2/1976  Canada .

Primary Examiner—Carman J. Seccuro, Jr.
Attorney, Agent, or Firm—Timothy R. Kroboth

[57] ABSTRACT

A composition useful for rotational molding and method of rotomolding are provided. The composition advantageously includes particulate matter of significantly different sizes. A first polymer is provided as particulate matter of one size, and a second polymer is provided as particulate matter of a smaller size. During rotomolding, the first polymer forms an inner layer and the second polymer forms an outer layer. Beneficially, foaming may be provided during rotomolding to foam the inner layer.

10 Claims, No Drawings

POLYOLEFIN-BASED COMPOSITION FOR ROTATIONAL MOLDING

FIELD OF THE INVENTION

This invention relates to thermoplastic polymers of ethylene suitable for fabrication into useful products, by rotational molding.

BACKGROUND OF THE INVENTION

Rotational molding, more commonly known as rotomolding, is widely used for molding hollow articles such as outdoor sports equipment, storage tanks and refuse containers. To rotomold a part, a powdered resin is charged inside a mold shell, which is then rotated on two axes and heated inside an oven to cause the resin to adhere to the inside of the mold. After sufficient heating time, the mold is moved to a cooling chamber, and after cooling, the molded part is removed to begin another molding cycle. A more detailed discussion of rotomolding may be found in *Modern Plastics Encyclopedia* 1990, pages 317–318.

Rotational molding primarily uses polyolefin resins, with thermoplastic polymers of ethylene being principally used. Polyethylene resin suitable for rotational molding is generally a medium density resin.

Foaming agents are useful to reduce part weight, provide a higher insulation value, increase stiffness and reduce resin cost. Generally, foaming agents may be classified as "physical" or "chemical" foaming agents. Typically, physical foaming agents are normally gaseous at the temperature at which the plastic mass is to be foamed. Chemical foaming agents are typically compositions which decompose or react to form a gas. Heat decomposable, foaming agents include organic compounds such as azodicarbonamide, 4,4'-oxybis-benzene-sulfonyl hydrazide, and p-toluenesulfonyl hydrazide; disadvantages include cost and unpleasant odor. Carbon dioxide-releasing, foaming agents include inorganic salts such as sodium, ammonium, and potassium bicarbonate. A foaming coagent is advantageously used with a reactive type, chemical foaming agent, and for an acid-released, foaming agent, a fatty acid such as stearic acid or a mild organic acid such as citric acid is often used as the coagent.

Useful additives when foaming thermoplastics include nucleating agents. A nucleating agent promotes uniform cell size and reduces the existence of surges and voids in the foam. As exemplified by U.S. Pat. Nos. 4,107,354, 4,110,269 and 4,275,168, nucleating agents useful when foaming polyolefins include calcium carbonate; pigments such as carbon black; and silicates such as kaolins, talc, aluminum silicate, magnesium silicate, and calcium silicate.

Despite advances in polyolefin-based, rotomolding compositions, there is a need for an improved polyolefin-based composition and method for providing rotomolded articles having an inside layer or core of one resin, and an exterior layer or skin of a different resin. It would be beneficial if the inside layer or core could be selectively foamed or selectively strengthened, and if the exterior layer or skin could be provided with improved toughness.

SUMMARY OF THE INVENTION

In accordance with the present invention, a novel rotomolding composition and method of rotomolding are provided. In a beneficial application, a foamable, rotomolding composition and method of rotomolding the composition to produce foamed articles advantageously having a smooth outer skin are provided. In this application, the inside layer or core is foamed, and the exterior layer or skin is unfoamed and hence smooth. Polyethylene resins are beneficially selected for use in the invention. In another application, the inside layer may include a suitable filler for imparting strength.

An important feature of the present invention is the use of particulate matter of significantly different sizes during rotomolding. More particularly, when two significantly different sizes of particulate matter are used, a first polymer being provided as particulate matter of one size, and a second polymer being provided as particulate matter of a smaller size, the first polymer will form an inside layer or core and the second polymer will form the outer skin, of a rotomolded article.

Advantageously, for a foamed inside layer or core, the first polymer is provided in admixture with foaming additives, that is, a foaming agent and nucleating agent, and a foaming coagent if needed, as the larger sized, particulate matter. In this way, the foaming additives best function to foam the first polymer, and are kept out of the skin. Depending upon the foaming agent selected, a foaming coagent may, as indicated, be beneficial or necessary. For instance, when a bicarbonate salt is used as the foaming agent, a foaming coagent may beneficially provide an acidic environment.

Similarly, when a filled inside layer is desired, the first polymer is provided in admixture with a suitable filler, as the larger sized, particulate matter. In this embodiment, foaming may be unnecessary to obtain adequate structural strength.

As indicated, layering occurs during rotomolding. The rotomolded product may be a hollow article. When the first polymer is foamed during rotomolding, the product may have a foamed inner layer of limited thickness, for instance up to about one-fourth to one-half inch, herein termed "hollow foamed article"; may have a foamed inner layer that fills the interior space, herein termed a "solid foam core"; or may have a foamed inner layer intermediate in thickness between the layer of the hollow foamed article and a solid foam core. As indicated, the rotomolded article advantageously may have a skin that is not foamed.

DETAILED DESCRIPTION OF THE INVENTION

As indicated above, the present invention relates to a polyolefin-based composition, and to a method of rotomolding. In accordance with the invention, rotomolded articles having a solid foam core can be made. Uses of such articles include knee boards, double wall hazardous waste containers, and double wall man hole liners. Moreover, rotomolded articles having a tough outer skin can be manufactured. Furthermore, rotomolded articles including a flame retardant can be produced. In addition, in accordance with the invention, dusting may be advantageously reduced during processing.

This detailed description is made with reference to a preferred application of the present invention, in which the polymer provided as larger-sized, particulate matter is foamed, and the polymer provided as smaller-sized, particulate matter is unfoamed. In this description, the polymer provided as larger-sized, particulate matter is therefore referred to, for convenience, as the foamable polymer, and the polymer provided as the smaller-sized, particulate matter is referred to as the skin-forming polymer. It will be understood, however, that this detailed description may be applied to a rotomolded product in which no foaming is effected by avoiding admixture with a foaming agent and/or foaming additives.

Polyolefins useful as the foamable polymer include thermoplastic polymers of ethylene. Polyethylene homopolymers, ethylene copolymers, and a mixture of both are particularly suitable. The olefin polymer used in this invention, may be an ethylene homopolymer or ethylene copolymer comprised of a major part of ethylene monomer. A typical copolymer will usually contain at least about 75% by weight of ethylene monomer. Useful monomers for a minor part of ethylene copolymer include C3–C8 alkenes, typically an acyclic branched or straight chain olefin such as butene, hexene and octene. Illustrative alpha-olefins include 1-hexene.

Use of polyethylene homopolymer and of ethylene copolymer compositions for rotomolding applications, is well known, as illustrated in U.S. Pat. Nos. 3,876,613, 5,260,381 and 5,367,025 to Needham. In the present invention, a crosslinking agent may be beneficial in admixture with a foamable polymer because it enables use of a foamable polymer having a high melt index, which may result in processing advantages. In addition, a crosslinking agent may also be used in the present invention in admixture with a skin-forming polymer to provide an outer skin with improved toughness.

Suitably, a polyolefin useful as the foamable polymer has a melt index of from about 1 to 25 gm/10 minutes, as determined by ASTM D1238, condition "E". Beneficially, the melt index is from about 5 to 25, especially 10 to 20, gm/10 min, to assist extrusion blending at a temperature less than about 300° F., if needed. In this regard, I have found that too high an extrusion blending temperature may result in premature foaming when sodium bicarbonate is selected as the foaming agent and certain foaming additives such as stearic acid are used.

A suitable density for the foamable polymer is typically in the range of about 0.91 to 0.96 gm/cc, as determined by the ASTM 1505 testing procedure. Beneficially, the density is from about 0.91 to 0.93 gm/cc, to assist extrusion blending at a temperature less than about 300° F., if needed to prevent premature foaming. Other considerations in selecting density include desired thickness of the inner layer or core, and desired rigidity of the rotomolded product. In this regard, a low density polyolefin will typically be selected for a relatively flexible cross-section, whereas a relatively higher density polyolefin will usually be selected for a relatively more rigid cross-section. Thus, resins having a density of about 0.935 to 0.960 gm/cc, may be used to provide more rigid structures.

Suitably, the skin-forming polymer will have a melt index of from about 1 to 25 gm/10 minutes. Generally speaking, the lower the melt index, the higher the molecular weight and the tougher the skin. However, for rotomolding, the melt index will typically not be below about 3.5 gm/10 min. Accordingly, a tough, high impact strength skin will usually result from the selection of a resin having a melt index of from about 4 to 8, preferably 5 to 6.5, gm/10 min.

A stiff skin may also be desirable, but as stiffness increases, toughness and impact resistance decrease. Accordingly, a useful density for the skin-forming polymer will typically be in the range of about 0.91 to 0.945 gm/cc, with relatively greater toughness when the density is in the range of about 0.915 to 0.925 gm/cc.

Useful skin-forming polymers within the foregoing description include thermoplastic polymers of ethylene. Polyethylene homopolymers, ethylene copolymers, and a mixture of both are particularly suitable. The olefin polymer may be an ethylene homopolymer or ethylene copolymer comprised of a major part of ethylene monomer. A typical copolymer will usually contain at least about 75% by weight of ethylene monomer. Useful monomers for a minor part of ethylene copolymer include. C3–C8 alkenes, typically an acyclic branched or straight chain olefin such as butene, hexene and octene. Illustrative alpha-olefins include 1-hexene. Other useful co-monomers include ester group-bearing alkenes such as vinyl esters. Exemplary is vinyl acetate co-monomer, a C2 alkene.

A benefit of the present invention is that different resins may be used to provide the inner layer or core, and the skin. As a result, the inner layer or core, and skin may have substantially different properties. A further benefit is that, compared to U.S. Pat. No. 5,366,675, there is no need for a skin-forming polymer of higher melt index than that of the inner layer- or core-forming polymer. If desired, the inner layer- or core-forming polymer may have a higher melt index than the skin-forming polymer, or the same resin may be used to provide the inner layer or core, and the skin.

A further benefit of the present invention is that a thicker skin may be formed than with the invention of U.S. Pat. No. 5,366,675. Accordingly, the present invention makes possible the combined benefit of increased skin thickness and use of a lower melt index polymer for forming the skin.

Polyethylenes suitable as the foamable polymer or the skin-forming polymer, include linear low density ethylene-hexene copolymers and medium density ethylene-hexene copolymers. Exemplary linear low density polyethylenes include Novacor 8111, which has a density of 0.918 gm/cc and a melt index of 15 gm/10 min. Exemplary medium density polyethylenes include Phillips TR-938, which has a density of 0.938 gm/cc and a melt index of 3.9 gm/10 min; and Esso 8460, which has a density of 0.939 gm/cc and a melt index of 3.6 gm/10 min. An illustrative ethylene vinyl acetate copolymer for use as the skin-forming polymer, is ELVAX 750, which contains 9% vinyl acetate, has a density of 0.93 gm/cc and a melt index of about 9 gm/10 min, and is available from DuPont.

When a crosslinkable polyolefin is used, the melt index may range up to about 30 or more gm/10 min. Moreover, in this case, the density may be in the range of about 0.95 to 0.962 gm/cc. As indicated earlier, a crosslinkable, high melt index polyolefin may beneficially provide processing advantages during extrusion blending. In addition, a crosslinkable polyolefin permits melt strength to be built through crosslinking, as foaming takes place. Also, as mentioned earlier, a crosslinkable polyolefin may be used to provide an outer layer or skin having improved toughness. Suitable crosslinking agents and crosslinking additives are described in U.S. Pat. Nos. 3,876,613, 5,260,381 and 5,367,025 to Needham. For sake of brevity, disclosure in these patents relating to crosslinking agents and crosslinking additives, is hereby incorporated herein by reference.

A suitable ratio of the foamable polymer to the skin-forming polymer depends upon factors including the particular product and desired outer skin thickness. As mentioned, a benefit of the present invention is that a thicker skin may be formed herein than with the invention of U.S. Pat. No. 5,366,675. Generally speaking, a major part of the foamable resin will be used to a minor part of the skin-forming resin. Typically, about 50 to 90 wt.% of the foamable resin, and about 10 to 50, preferably about 25, wt.% of the skin-forming resin, will be used. To increase thickness of the skin, a relatively higher level of the skin-forming resin may be beneficially used.

The foaming agent is beneficially a chemical foaming agent. Foaming is advantageously provided when the thermoplastic mass being rotomolded is in a molten state. To this end, a gas-releasing, foaming agent should release gas at a temperature near the melting temperature of the foamable polymer; otherwise, if the release temperature is too high, the foamable polymer may have inadequate melt viscosity during foaming, and collapse of foam structure may result. A bicarbonate-based, inorganic salt is illustrative of a reactive type of chemical foaming agent that releases carbon dioxide during rotomolding. Useful bicarbonate foaming agents include salts of a Group 1A metal such as sodium, and sodium bicarbonate is a preferable foaming agent. Foaming agents may be used alone or in combination; thus, for example, sodium bicarbonate and potassium bicarbonate may be used together.

A foaming coagent providing for reactive release of gas, will be beneficially selected for use with a reactive type, chemical foaming agent. For an acid-released, foaming agent, the coagent may be a proton donor such as citric acid or otherwise serve as a proton source. I have found that a coagent is particularly useful for forming solid foam cores, when sodium bicarbonate is selected as the foaming agent.

The appropriate amount of foaming agent will vary depending upon factors including the foaming agent selected, the degree of foaming desired, and the intended product. Generally speaking, a relatively lower loading of foaming agent will be used to make hollow foamed articles than to make an article having a solid foam core. Beneficially, at least about 0.3 parts by weight for hollow foamed articles, and from about 1 to 8 parts by weight for a solid foam core, of foaming agent may be used. If desired, higher loadings may be used; however, cost considerations may dictate use of no more than an effective loading. In any event, a sufficiently high loading will be used to achieve the intended result.

The amount of foaming coagent will similarly vary. Suitably, the coagent may be used in an amount ranging from an about 1:10 ratio to 1:4 ratio, on a weight basis, of coagent to foaming agent. In any event, sufficient foaming coagent will be used to provide for the intended degree of foaming.

Also beneficially included as a foaming additive is a nucleating agent. A nucleating agent advantageously may increase the containing melt strength of the foamable polymer and provide for controlled cellular expansion. Generally speaking, a uniform foam will be desired. For a solid core foam, the foam cells may be larger in size and yet provide adequate structural support. For a hollow foamed article, it is usually preferable that the foam cells be smaller in size. Relatively smaller size is especially beneficial for increased rigidity. If the nucleating agent were omitted or used in an inadequate concentration, foam cells may overexpand and rupture, or may be too large, and uniformity of cellular structure may be lacking.

A suitable nucleating agent is typically of small particle size, which contributes to a dusting problem. Typically, the nucleating agent will have a particle size in the range of from about 0.05 to 50 microns, preferably about 0.1 to 25 microns.

The appropriate amount of the nucleating agent will vary depending upon factors including the foaming polymer selected, the cell size desired, the particle size of the nucleating agent, and the foaming conditions. Generally speaking, a relatively smaller cell size and greater cell structure uniformity may be obtained by use of a relatively higher level of the nucleating agent. Suitably, at least about 0.1 to 2 parts by weight, preferably about 0.5 to 1 part by weight, of the nucleating agent will be used. In any event, an appropriate level of nucleating agent will be used to provide for the intended cell structure.

Certain foaming additives may have not only a nucleating effect but also a coagent effect with certain foaming agents. For instance, a nucleating agent that has sufficient acidity, may function as a coagent for an acid-released, foaming agent. Accordingly, characterization as a nucleating agent, or as a nucleating agent and coagent may vary depending upon the system chemistry and foaming conditions.

Even so, useful nucleating agents for foamable polyethylenes include carbon black, graphite, titanium dioxide, iron oxide, stearates, and silicates such as talc. Nucleating agents such as stearamide, may have a coagent effect when sodium bicarbonate is the foaming agent. Suitability of a nucleating agent may also depend upon the intended product. For example, although calcium stearate may be used for hollow foamed articles or solid foam core parts, zinc stearate produces too much foaming for making hollow foamed articles but is highly advantageous for making a solid foam core. Mixtures of nucleating agents may, of course, be used.

For making solid foam core parts, I prefer stearamide, a mixture of stearic acid and zinc stearate, and a mixture of calcium stearate and stearamide, as foaming additives for sodium bicarbonate. An about 1:1 ratio of stearic acid to zinc stearate is particularly beneficial, as is an about 2:1 ratio of stearamide to calcium stearate.

Other additives may be incorporated as needed or appropriate. Illustrative is a suitable filler for imparting strength to the inside layer. When a filled inside layer is used, foaming may be unnecessary to obtain adequate structural strength. Exemplary fillers include mineral fillers and glass fibers. Specific examples of fillers are clays, talc, magnesium carbonate, zinc carbonate and calcium carbonate. Mixtures of fillers such as a combination of magnesium carbonate, zinc carbonate and calcium carbonate, may be used. A glass fiber useful as a filler will conveniently be short, for instance, about 0.2 to 0.3 mm in length.

An appropriate loading of filler will vary depending upon considerations including the degree of strength desired. As thus may be understood, an effective level of filler will be used to provide the intended strength, with relatively more filler being used to provide relatively more strength.

Another useful additive is a flame retardant. This type additive beneficially reduces flame spread. Exemplary flame retardants include magnesium hydroxide and aluminum trihydrate. A difficulty with aluminum trihydrate is premature foaming during extrusion blending. However, as may be understood, a flame retardant will be useful regardless whether or not foaming is used. An effective loading of the flame retardant will be used, as is conventional.

Other useful additives include processing aids, anti-oxidants, UV stabilizers, pigments and anti-static agents. As appropriate, these may be used in conventional loadings. The skin-forming resin may be, for instance, combined with colorants or pigments, and UV stabilizers.

Beneficially, the foamable polymer is combined with additives including foaming additives, so as to prevent foaming of the skin-forming polymer. To this end, the foamable polymer and foaming additives may be extrusion blended, extruded through a die into strands and pelletized. As earlier indicated, temperature control of the extrusion blending may be necessary to prevent premature foaming. Similarly, the skin-forming resin and additives other than foaming additives, may be so processed, and the pellets ground to provide a powder for rotomolding.

As mentioned earlier, rotomolding typically uses powdered resin. Problems with grinding to powder include undesirable dusting and higher cost. In accordance with the present invention, I have investigated rotomolding using pellets of substantially different sizes, with one size to provide the inner layer or core and the other size to provide the skin. I have found that when two significantly different sizes of particulate matter are used during rotomolding, a first polymer being provided as particulate matter of one size, and a second polymer being provided as particulate matter of a smaller size, that the first polymer will form the inner layer or core and the second polymer will form the outer skin of a rotomolded article. As a result, I am no longer limited as to the relative melt indices of the inner layer-forming polymer and skin-forming polymer, as described in U.S. Pat. No. 5,366,675. A benefit is flexibility in selection of the respective polymers, with the capability of providing a tougher skin, and of even using crosslinkable resins to provide, for instance, a skin of improved toughness.

The present invention advantageously uses particulate matter of substantially different sizes so as to result in a differentiation during rotomolding whereby the resin of the smaller particulate matter forms an outer skin, and the resin of the larger particulate matter forms an inner layer or core, of a rotomolded article. Thus, the smaller particulate matter may be a powder. Accordingly, as used herein, "particulate matter" means solid matter of a size generally considered to be a powder, and solid matter in any form, for instance, pellets, wafers and the like, and being of a larger size generally considered not a powder. Generally speaking, a powder will range in size from about 20 to 50 mesh. A suitable size for the larger sized solids is a diameter of about 0.04 to 0.15" and a length of about 0.04 to 0.125".

Useful exemplary combinations include pellet/powder, and larger pellet/smaller pellet or wafer. A pellet need not be a sphere, although a sphere is a convenient shape, but may be ovoid. The particular shape is not important. The skin-forming polymer will be generally used in the form of mini-pellets/wafers or resin ground to powder. If powdered, the size preferred is within the range of about 20 to 35 mesh.

As will be understood, the size difference is not capable of being quantified with precision. Rather, the size difference will vary depending upon factors including the rotomolding conditions, in particular the operating temperature for rotomolding, and including the resins involved. Also, the size difference will depend upon the intended product. For some products, uniformity will not be necessary, and in this case, the sizes may be relatively closer to one another. Also, the size difference should, generally speaking, not be so great as to disadvantageously increase the cycle time. Reference is made to Tables 4 to 8 for guidance as to a suitable size difference. Illustrated therein are larger pellets of about 0.06" diameter and length or 0.08" diameter and 0.06" length, and mini-pellets or wafers of about 0.06" diameter and about 0.02 to 0.03" length.

While not intending to be bound by the following theory, it appears that particulate matter of a smaller size melts first so as to adhere to the inside of the mold during rotomolding and form the skin, and that particulate matter of a larger size melts and is foamed after the smaller size particulate matter has formed the skin so as to form an inner foamed layer or core.

In accordance with the present invention, particulate matter of substantially different sizes is rotomolded inside a hollow mold, which is typically rotated on two axes inside a heated oven. By the process, the mixture is heated for a sufficient time and at a temperature adequate to melt the inner layer- or core-forming polymer and skin-forming polymer during the rotomolding, and apparently to preferentially melt the skin-forming polymer first. Other considerations affecting time and temperature include the thickness of the part being rotomolded, the thickness of the skin layer, thermal sensitivity of the constituents, and the conditions needed for foaming. As applied to polyethylene resins, a temperature ranging from about 500° to 650° F. for about 10 to 20 minutes will typically provide sufficient melting and foaming conditions.

Processing advantages of using the skin-forming resin as a mini-pellet or wafer, rather than as a powder, include reduced bulk density. Also affecting the product is the charge size, particularly of the inner layer- or core-forming polymer; thus, density will be affected by the charge size, as will whether or not a solid foam core is produced.

In the illustrations that follow and throughout this description, all parts and percentages are weight percent unless otherwise specified.

Tables 1 to 4 are intended, among other things, to demonstrate different foam densities, control of foam densities, different nucleating agents, and nucleating/coagent effects. Table 2 is directed to hollow foam articles in particular. Tables 4–8 demonstrate use of particulate matter of substantially different sizes in accordance with the present invention.

In Table 1, the polyethylene base resin is Phillips TR-938, which has a density of 0.938 gm/cc and a melt index of 3.9 gm/10 min. The skin is formed by ELVAX 750, an ethylene vinyl acetate copolymer containing 9% vinyl acetate, having a density of 0.93 gm/cc and a melt index of about 9 gm/10 min, and available from DuPont.

A preblend of the ethylene vinyl acetate

TABLE 1

| Run | Foaming Agent | Nucleating Agent | EVA | Foam Density |
|---|---|---|---|---|
| 1 | — | — | — | 60.2 |
| 2 | 0.2% | 0.04% | 1.0% | 45.6 |
| 3 | 0.45 | 0.1 | 2.5 | 20.0 |
| 4 | 0.6 | 0.1 | 3.0 | 13.6 |
| 5 | 0.75 | 0.15 | 3.5 | 10.0 |
| 6 | 1.2 | 0.25 | 4.0 | 7.5 |
| 7 | 1.8 | 0.35 | 5.0 | 6.2 |

Foaming Agent is sodium bicarbonate, and nucleating agent is calcium stearate. Foam density: pounds per cubic foot.

TABLE 2

| Run | Foaming Agent | Nucleating Agent | EVA | Foam Density |
|---|---|---|---|---|
| 1 | 0.3% | CB 0.02% | 1.5% | 28 |
| 2 | 0.6 | CB 0.04 | 3.0 | 11.5 |
| 3 | 0.3 | GP 0.015 | 1.5 | 28.5 |
| 4 | 0.6 | GP 0.03 | 3.0 | 14 |
| 5 | 0.3 | TD 0.1 | 1.5 | 27.8 |
| 6 | 0.6 | TD 0.2 | 3.0 | 12.5 |
| 7 | 0.3 | TC 0.2 | 1.5 | 31.3 |
| 8 | 0.6 | TC 0.4 | 3.0 | 15.2 |
| 9 | 0.3 | IO 0.1 | 1.5 | 32 |
| 10 | 0.6 | IO 0.2 | 3.0 | 15.4 |
| 11 | 0.3 | CS 0.05 | 1.5 | 29.2 |

TABLE 2-continued

| Run | Foaming Agent | Nucleating Agent | EVA | Foam Density |
|-----|---------------|------------------|-----|--------------|
| 12  | 0.6           | CS 0.1           | 3.0 | 13.6         |

Foaming Agent is sodium bicarbonate. Nucleating Agent is as indicated. CB means carbon black, GP means graphite, TD means titanium dioxide, TC means talc, IO means iron oxide, and CS means calcium stearate. Foam density: pounds per cubic foot.

copolymer is prepared using a 1:1 ratio of the copolymer to a polyethylene resin having a melt index of 20 gm/10 min and a density of 0.953, available from Mobil. The preblending is carried out by extrusion blending, pelletizing, and grinding to a powder.

The desired level of EVA is attained by letting down the preblend in the Phillips TR-938 in an appropriate proportion. The remaining constituents indicated in Table 1, are added. The powdery mixture is dry blended using a mechanical blender, and thereafter rotomolded in a cylindrical mold for about 17 minutes at an oven setting of about 600° F. The rotomolding is on two axes as follows: 12 rpm on axis #1 and 6 rpm on axis #2. After the rotomolding and after cooling, a molded cylinder is removed from the mold.

Run 1 of Table 1 is comparative. Without foaming, wall thickness is 0.125". Foam density is determined by comparative thickness of the cylinder walls. The cylinders of Runs 2–7 have translucent skins free of bubbles. Thickness of the skins is found to increase with increasing EVA level. Foam density and control of foam density are shown in Table 1.

In Table 2, the polyethylene base resin has a density of about 0.938 gm/cc and a melt index of about 3.8 gm/cc, and is available from Exxon under the designation 8461. The EVA is the same as before. A preblend of the ethylene vinyl acetate copolymer in the same carrier resin as before (1:1 ratio), is let down into the polyethylene base resin in an appropriate proportion. The remaining constituents are added, and the mixture is dry blended using a mechanical blender.

The mixtures are rotomolded in a cylindrical mold for about 17 minutes at an oven setting of about 600° F. The rotomolding is on two axes as before. After the rotomolding and after cooling, a hollow molded cylinder is removed from the mold.

Each cylinder has a translucent, flexible outer skin free of bubbles. Foam density of each molded cylinder is found to be as indicated in Table 2. Control of foam density using different nucleating agents, is illustrated in Table 2.

In Table 3, polyolefin-based compositions constituted as shown, include a medium density polyethylene as specified therein, and 2% sodium bicarbonate. In runs 6–8, ethylene vinyl acetate copolymer as specified in the Table, is additionally included, a preblend (1:1) of the EVA copolymer is prepared as before, and the preblend is let down into the medium density polyethylene in an appropriate proportion.

The compositions of Table 3 are dry blended and thereafter rotomolded in a cylindrical mold at an oven setting of about 575° F. Rotomolding is on two axes as before, and the cycle time is 20 minutes. After cooling, a molded cylinder is removed from the mold.

The molded cylinders of Runs 1–5 lack an EVA skin, whereas the cylinders of Runs 6–8 have an EVA skin. Details concerning the foam structure of the molded cylinders are given in Table 3. Whereas the foam structure of a hollow foamed article is generally intended to be less than about one inch, typically about one-half inch or less, these cylinders are characterized by either a solid foam core or by a structure that is nearly a solid foam core (Runs 1 and 7).

Increased foaming is produced by higher loading of the foaming agent and foaming additives, as well as by selection of the foaming additives. Nucleating agents/ foaming coagents that permit too much foaming for a hollow foamed article, such as zinc stearate, stearic acid and fatty primary amides such as stearamide, are effective for producing a solid foam core.

TABLE 3

| Run | Nucleating Agent/Coagent | EVA | Foam Structure |
|-----|--------------------------|-----|----------------|
| 1 | 0.25% zinc stearate | — | not solid |
| 2 | 0.5% stearic acid | — | solid, some voids |
| 3 | 0.25% zinc stearate 0.25% stearic acid | — | solid, small cells |
| 4 | 0.5% stearamide | — | solid, small cells |
| 5 | 0.5% oleamide | — | solid, large uneven cells |
| 6 | 0.5% stearamide | 5% | solid, small cells |
| 7 | 0.2% erucamide | 5% | not solid |
| 8 | 0.5% erucamide | 5% | solid, large cells |

The polyethylene being foamed is Phillips TR-938: ethylene-hexene copolymer, density 0.938 gm/cc, melt index 3.9 gm/10 min. EVA is ELVAX 750: ethylene vinyl acetate copolymer, 9% vinyl acetate, density 0.93 gm/cc, melt index about 9 gm/10 min. Foaming Agent is sodium bicarbonate, 2 wt.%.

TABLE 4

| Run | F/A | Nucleating Agent/Coagent | Foam Structure |
|-----|-----|--------------------------|----------------|
| 1 | 2% | 0.5% stearamide | foam did not fill mold completely, large cells several large voids |
| 2 | 5% | 1% stearamide | solid foam, few voids |
| 3 | "  | 1% stearamide 0.5% calcium stearate | solid foam, smaller, more uniform cells |
| 4 | "  | 0.5% stearic acid 0.5% zinc stearate | solid foam, small cells more uniform cells |

Pellet contains Novacor 8111: ethylene-hexene copolymer, density 0.918 gm/cc, melt index 15 gm/10 min; sodium bicarbonate as foaming agent (F/A); and nucleating agent/coagent. Pellet dimensions: L=0.08"; D=0.1".

Also illustrated in Table 3 is nucleating agent/foaming coagent control of foaming, foam cell size and uniformity, and prevention of cell rupture. As demonstrated, a generally uniform foam structure consisting of small cells may be produced by selecting either the combination of zinc stearate and stearic acid, or stearamide.

In Table 4, the foamable polymer is Novacor 8111, an LLDPE. The LLDPE is extrusion blended at a temperature of about 240° F. with the other ingredients specified, extruded as a strand of 0.1" diameter, and cut to form pellets of 0.08" length. Thereafter, a 60 g charge of the pellets is rotomolded in a cylindrical mold and heated in an oven at a temperature of about 500° F. The rotomolding is on two axes as before, and the cycle time is about 12 minutes. After cooling, a molded cylinder is removed from the mold.

The results are shown in Table 4. Details concerning the foam structure of the molded cylinders are given. The molded cylinders lack an unfoamed skin. Illustrated is nucleating agent/foaming coagent control of foaming, foam cell size and uniformity, and prevention of cell rupture. As demonstrated, a generally uniform foam structure consisting of smaller cells than Run 2, or small cells may be produced by selecting either a combination of stearamide and calcium stearate, or a combination of zinc stearate and stearic acid, respectively.

In Table 5, the foamable polymer is again Novacor 8111. The LLDPE is extrusion blended at a temperature of about 234° to 238° F. with the other ingredients specified, extruded as a strand, and cut to form pellets of the approximate sizes specified in the Table. "D" indicates the diameter of the respective strand and "L" indicates the pellet length.

Phillips TR-938, which is a medium density

TABLE 5

| Run | Pellets | Powder | Product |
|---|---|---|---|
| 1 | L = 0.4", D = 0.08" | green powder | solid foam core with some voids, green skin |
| 2 | L = 0.04", D = 0.06" | " | solid foam core, small uniform cells, green skin |
| 3 | L = 0.06", D = 0.06" | " | solid foam core, few voids next to skin, green skin |

Pellets contain Novacor 8111: ethylene-hexene copolymer, density 0.918 gm/cc, melt index 15 gm/10 min; 2% sodium bicarbonate as foaming agent; 0.5% stearic acid, 0.5% zinc stearate as foaming coagent and nucleating agent.

Green powder is Phillips TR-938: ethylene-hexene copolymer, density 0.938 gm, melt index 3.9 gm/10 min; and green colorant. Powder is 35 mesh.

TABLE 6

| Run | Pellets | Powder | Ratio | Product |
|---|---|---|---|---|
| 1 | L = 0.04", D = 0.06" | XLPE | 3:1 | solid foam core with 0.03" skin |
| 2 | " | " | 3:2 | solid foam core with 0.06" skin |
| 3 | " | " | 3:1 | solid foam core, bubbles in skin |

Pellets contain Novacor 8111; 2% sodium bicarbonate as foaming agent; 0.5% stearic acid, 0.5% zinc stearate as foaming coagent and nucleating agent; 0.1% dilauryl thiodipropionate. Powder is crosslinkable resin, 35 mesh.

polyethylene, and a green colorant are extrusion blended, pelletized and ground to provide a green powder. Thereafter, a 3:1 weight ratio of the pellets to green powder is rotomolded in a cylindrical mold and heated in an oven at a temperature of about 590° F. The rotomolding is on two axes as before, and the cycle time is about 15 minutes. After cooling, a molded cylinder is removed from the mold.

The results are shown in Table 5. A solid foam core with a green skin is obtained. Use of particulate matter of substantially different sizes results in differentiation during rotomolding whereby the green-colored polymer of the smaller particulate matter forms a green outer skin, and the polymer of the larger particulate matter forms the core.

Moreover, there is criticality in the size difference that affects product uniformity. The pellet size of Run 2 appears to be the best. Apparently, the pellets of Runs 1 and 3 are too large under the rotomolding conditions used, for a uniform foam structure.

In Table 6, the foamable polymer is again Novacor 8111. The LLDPE is extrusion blended with the other ingredients specified, extruded as a 0.06" strand and cut to form pellets of 0.04" length. The pellet size is the same as for Run 2 of Table 5.

In Runs 1 and 2, a crosslinkable polyethylene resin of U.S. Pat. No. 5,260,381, commercially available as SUPER-LINK-NATURAL from Wedtech Inc., is used as a powder.

In Run 3, a crosslinkable polyethylene resin available from Phillips as MARLEX CL 200, is used as a powder.

The pellets and powder in the ratio specified in the Table, are rotomolded in a cylindrical mold and heated in an oven at a temperature of about 580° F. The cycle time is 12 minutes in Runs 1 and 3, and is 17 minutes in Run 2. The rotomolding is on two axes as before. After cooling, a molded cylinder is removed from the mold.

The results are shown in Table 6. A solid foam core with a cross-linked skin is obtained. As in Table 5, use of particulate matter of substantially different sizes results in differentiation during rotomolding whereby the crosslinkable polymer of the smaller particulate matter forms a cross-linked outer skin, and the polymer of the larger particulate matter forms the core. Also shown is that a relatively higher loading of the skin-forming resin produces a relatively thicker skin, and that selection of the crosslinkable resin may affect the presence or absence of bubbles in the skin.

In Table 7, the foamable polymer is again Novacor 8111. The LLDPE is extrusion blended with the other ingredients specified, extruded as a 0.06" strand and cut to form pellets of 0.06" length.

Esso 8460, which is a medium density polyethylene, and a black colorant are extrusion blended, extruded as a 0.06" diameter strand, and sliced into black wafers/pellets of the approximate lengths specified in Table 7. Thereafter, a 3:1 weight ratio of the pellets and black wafers/pellets is rotomolded in a cylindrical mold and heated in an oven at a temperature of about 590° F. for about 15 minutes. The rotomolding is on two axes as before. After cooling, a molded cylinder is removed from the mold.

The results are shown in Table 7. A solid foam core with a black skin is obtained. Use of particulate matter of substantially different sizes results in differentiation during rotomolding whereby the black-colored polymer of the smaller particulate matter forms the outer skin, and the polymer of the larger particulate matter forms the core.

Also shown is criticality in the size difference

TABLE 7

| Run | Pellets | Black P/M | Product |
|---|---|---|---|
| 1 | L = .06", D = .06" | L = .02", D = .06" | solid foam core, black skin |
| 2 | L = .06" D = .06" | L = .03", D = .06" | solid foam with a few black wafers, black skin |
| 3 | L = .06" D = .06" | L = .04", D = .06" | solid foam with many black wafers, black skin |

Pellets contain Novacor 8111; 2% sodium bicarbonate as foaming agent; and 0.5% stearamide as foaming coagent and nucleating agent. Black Particulate Matter (P/M) contain Esso 8460: ethylene-hexene copolymer, density 0.939 gm, melt index 3.6 gm/10 min; and carbon black colorant.

TABLE 8

| Run | Pellets | Black P/M | Product |
|---|---|---|---|
| 1 | L = .04", D = .06" | L = .04", D = .04" | solid foam with black pellets, black skin |
| 2 | L = .06", D = .08" | " | solid foam with a few black pellets, black skin |
| 3 | L = .06" D = .08" | " | solid foam core, 0.03" black skin |
| 4 | L = .06" D = .08" | L = .03", D = .06" | solid foam core, 0.03" black skin |

TABLE 8-continued

| Run | Pellets | Black P/M | Product |
|---|---|---|---|
| 5 | L = .06"<br>D = .08" | L = .03"<br>D = .06" | solid foam core,<br>0.06" black skin |

Pellets contain Novacor 8111; 2% sodium bicarbonate; 0.5% stearic acid and 0.5% zinc stearate (Runs 1,2); 0.5% stearamide (Runs 3–5). Black Particulate Matter (P/M) contain Novacor 8111 and carbon black colorant. 3:1 Ratio of Pellets: Black P/M (Runs 1–4); 3:2 Ratio (Run 5).

that affects product uniformity. The relative sizes in Run 1 appear to be the best. In Runs 2 and 3, the size of the black particulate matter appears in each case to be too close to the size of the pellets under the rotomolding conditions used, for a generally uniform foam free of wafers. In these Runs, it appears that incomplete melting of the black particulate matter occurs prior to melting and foaming of the core-forming polymer.

In Table 8, the foamable polymer is again Novacor 8111. The LLDPE is extrusion blended with the other ingredients specified, extruded as a strand, and cut to form pellets of the dimensions specified in the Table.

Novacor 8111 and a black colorant are extrusion blended, extruded as a strand, and sliced into black wafers/pellets of the approximate dimensions specified in the Table ("Black P/M"). Thereafter, a 3:1 weight ratio of the pellets and black wafers/pellets is rotomolded in a cylindrical mold, except that a 3:2 weight ratio is used in Run 5. In Runs 1–2, the rotomolding is at a temperature of about 580° F. for 12 minutes; in Runs 3–4, the rotomolding is at a temperature of about 590° F. for 12 minutes; and in Run 5, the rotomolding is at a temperature of about 600° F. for 15 minutes. The rotomolding is on two axes as before. After cooling, a molded cylinder is removed from the mold.

The results are shown in Table 8. A solid foam core with a black skin is obtained. Use of particulate matter of substantially different sizes results in differentiation during rotomolding whereby the black-colored polymer of the smaller particulate matter forms the outer skin, and the polymer of the larger particulate matter forms the core.

Also shown is criticality in the size difference that affects product uniformity. The product of Run 1 is considered unacceptable. Depending upon intended use, the product of Run 2 is acceptable. The relative sizes in Runs 3 and 4 appear to be the best. Comparison of Runs 4 and 5 shows that increased loading of the skin-forming resin produces a thicker skin.

The present invention may be carried out with various modifications without departing from the spirit or essential attributes thereof, and accordingly, reference should be made to the appended claims, rather than to the foregoing specification as indicating the scope of the invention.

I claim:

1. A foamable, rotomolding composition comprising a first thermoplastic polymer of ethylene, an effective amount of a suitable foaming agent, which comprises a carbon dioxide-releasing inorganic salt, and an effective amount of a suitable nucleating agent/foaming coagent selected from a mixture of stearic acid and zinc stearate, and a mixture of calcium stearate and stearamide, as particulate matter of a first size; and a second thermoplastic polymer of ethylene as particulate matter of a size significantly smaller than said first size for providing an outer skin to a rotomolded article; wherein said first thermoplastic polymer and said second thermoplastic polymer may be the same or different.

2. The foamable, rotomolding composition of claim 1, wherein said first thermoplastic polymer is selected from the group consisting of an ethylene homopolymer, an ethylene copolymer comprising a C3–C8 alkene, and mixtures thereof.

3. The foamable, rotomolding composition of claim 1, wherein second thermoplastic polymer is selected from the group consisting of an ethylene homopolymer, an ethylene copolymer having a comonomer selected from a C3–C8 alkene and an ester group-bearing C2 alkene, and mixtures thereof.

4. The foamable, rotomolding composition of claim 1, wherein said first thermoplastic polymer has a melt index approximately equal to the melt index of said second thermoplastic polymer.

5. The foamable, rotomolding composition of claim 1, wherein said second thermoplastic polymer is a linear low density polyethylene.

6. The foamable, rotomolding composition of claim 1, wherein said particulate matter of significantly smaller size further comprises a suitable cross-linking agent.

7. The foamable, rotomolding composition of claim 1, wherein said particulate matter of said first size is in the form of pellets.

8. The foamable, rotomolding composition of claim 1, further comprising as said particulate matter of said first size, an effective amount of a suitable flame retardant.

9. The foamable, rotomolding composition of claim 6, wherein said second thermoplastic polymer has a high melt index of up to about 30 gm/10 min. and a density of about 0.95 to 0.962 gm/cc.

10. The foamable, rotomolding composition of claim 1, wherein said carbon dioxide-releasing inorganic salt, foaming agent is a bicarbonate salt.

\* \* \* \* \*